Figure 1:
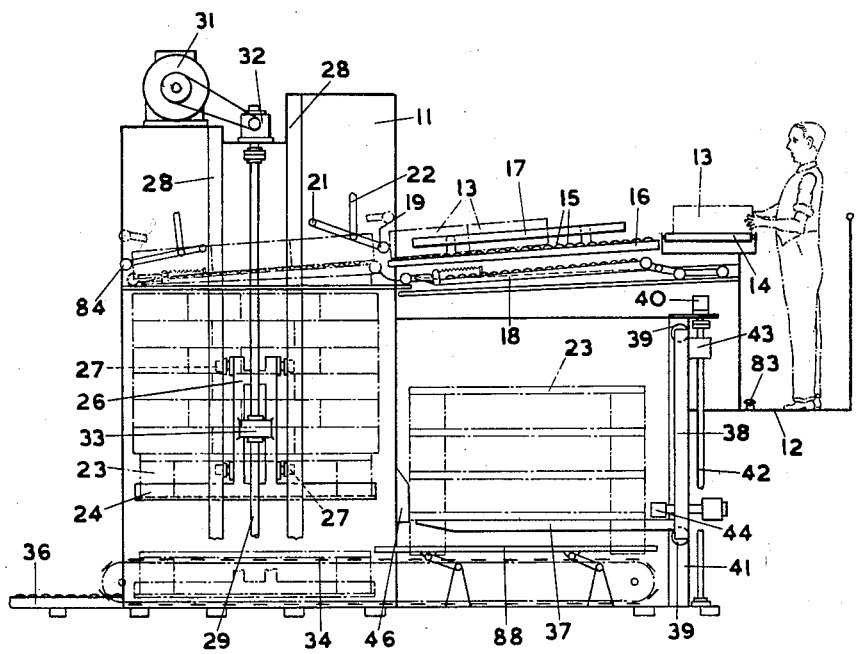

Nov. 17, 1964   W. N. BOLT   3,157,294
PALLET LOADING MECHANISMS
Filed Feb. 21, 1962   4 Sheets-Sheet 1

Nov. 17, 1964  W. N. BOLT  3,157,294
PALLET LOADING MECHANISMS
Filed Feb. 21, 1962  4 Sheets-Sheet 2

Nov. 17, 1964 W. N. BOLT 3,157,294
PALLET LOADING MECHANISMS
Filed Feb. 21, 1962 4 Sheets-Sheet 3

United States Patent Office 3,157,294
Patented Nov. 17, 1964

3,157,294
PALLET LOADING MECHANISMS
William Noel Bolt, Holly House Farm, Great Sankey,
Warrington, England
Filed Feb. 21, 1962, Ser. No. 174,869
3 Claims. (Cl. 214—6)

This invention relates to pallet loading mechanisms of the kind in which articles, e.g., packages, cases or crates, are arranged in successive layers on a loading platform from which each layer is transferred, as it is completed, on to a pallet, one layer on top of another, supported on a vertically movable carriage, the latter being lowered (from an elevated original position adjacent the loading platform) a distance equal to the height of a layer of articles after each layer is transferred, so that the upper surface of the layer lies in the plane originally occupied by the upper surface of the pallet, the transferring operations proceeding until the required number of layers are stacked on the pallet to complete a unit load. The term "pallet" as used herein is intended to mean a portable load-supporting platform of the kind now commonly used in association with load-carrying vehicles of the kind known as "fork-lift trucks." The loading platform usually consists of a frame containing a number of freely mounted rollers, the frame being inclined slightly downwardly towards the waiting pallet to act as a gravity conveyor. A movable stop is provided to limit the free movement of the articles along the platform and is controlled, e.g., pneumatically, by the operator arranging the articles on the platform, the stop being lifted to release each layer as it is completed. A further movable stop is provided to prevent over-running of the articles beyond the pallet, that stop being lifted (to allow the unit load to be moved forwardly) automatically by the movable carriage as it reaches its lowermost position upon positioning of the last layer of articles to complete the unit load. The construction and operation of the above kind of mechanism (referred to hereinafter as the "kind described") is well known, the movements of the various members being coordinated by controlling mechanism, e.g., electrical or pneumatic mechanism, or both, a cycle of operations being commenced by actuation of a controlling switch or valve by the operator upon completion of the arrangement of a layer of articles on the loading platform.

An object of the present invention is to provide a mechanism of the above kind in which the transfer of the successive layers is facilitated.

According to the present invention, there is provided a mechanism of the kind described, comprising a stripper plate mounted for movement into a load-receiving position above the pallet carriage and substantially in line with the loading platform and retractable to a position below the loading platform to strip the layer of articles off the plate, and a stripping abutment for engaging the rear face of the layer during the stripping action.

The stripper plate is conveniently mounted on rollers arranged to run in tracks in the framework of the mechanism, the portion of the tracks adjacent the forward edge of the loading platform being shaped to cause the rear edge of the plate to fall below the level of the platform during initial retracting movement of the plate.

The stripper plate conveniently consists of a frame in which is freely mounted a number of rollers so that the articles pass freely from the loading platform on to the stripper plate. The frame preferably terminates in a dead plate, however, to provide resistance to the articles as they approach the end stop. The dead plate also provides resistance during retraction of the stripper plate and thus tends to draw the articles tightly together as each layer is deposited.

The dead plate is preferably of wedge shape tapering to a narrow edge at its extremity so that it acts as a ramp down which the articles successively slide during the transferring action, thus avoiding any substantial drop. The dead plate is also preferably pivoted in the form of an end flap and spring-loaded upwardly against a limit stop. The upward inclination acts, during the forward movement of the plate, as a plough tending to push down any article that may not have properly settled down in the preceding layer.

Figure 2:
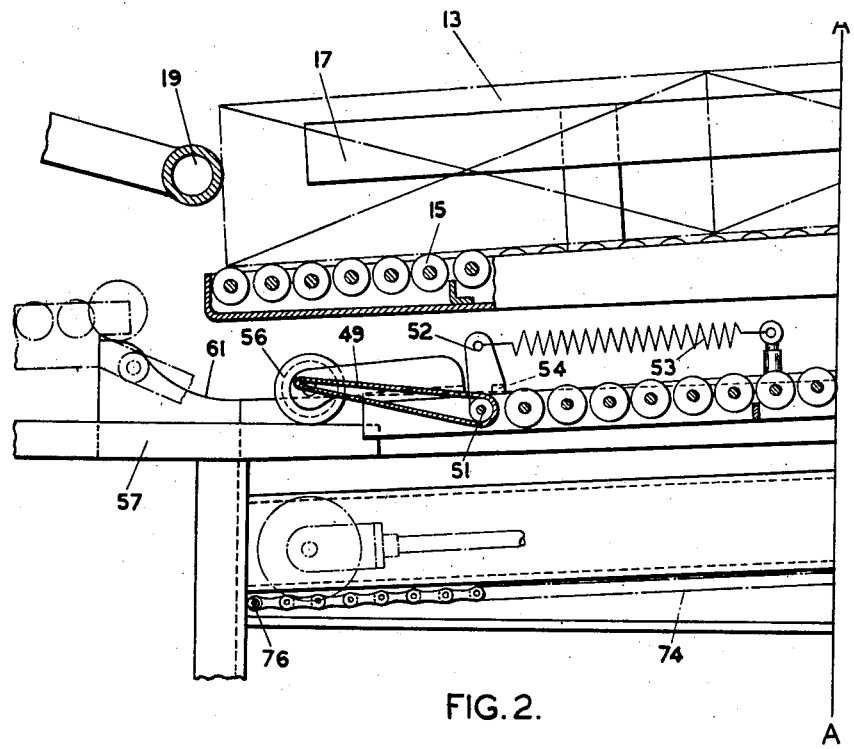
Figure 5:
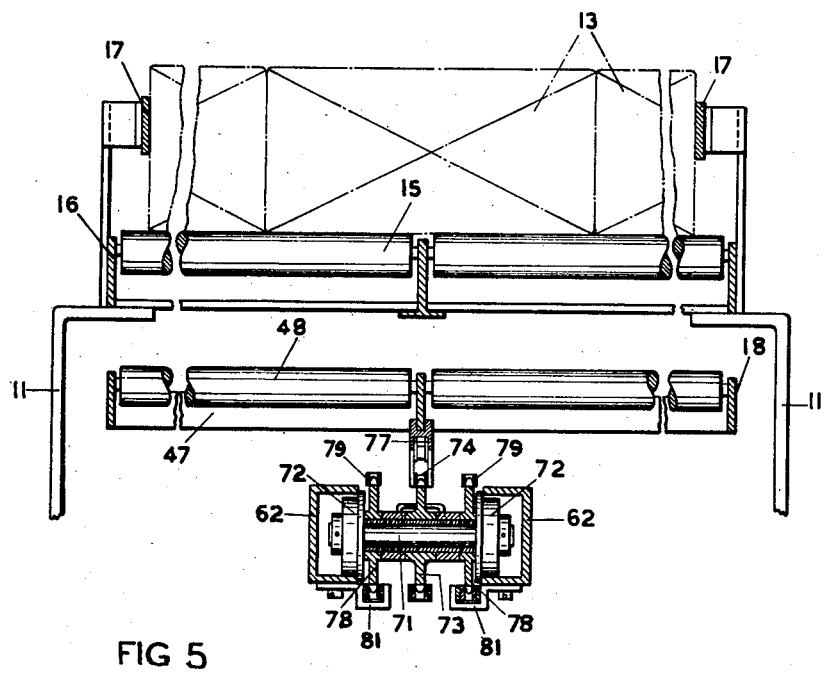
Figure 3:
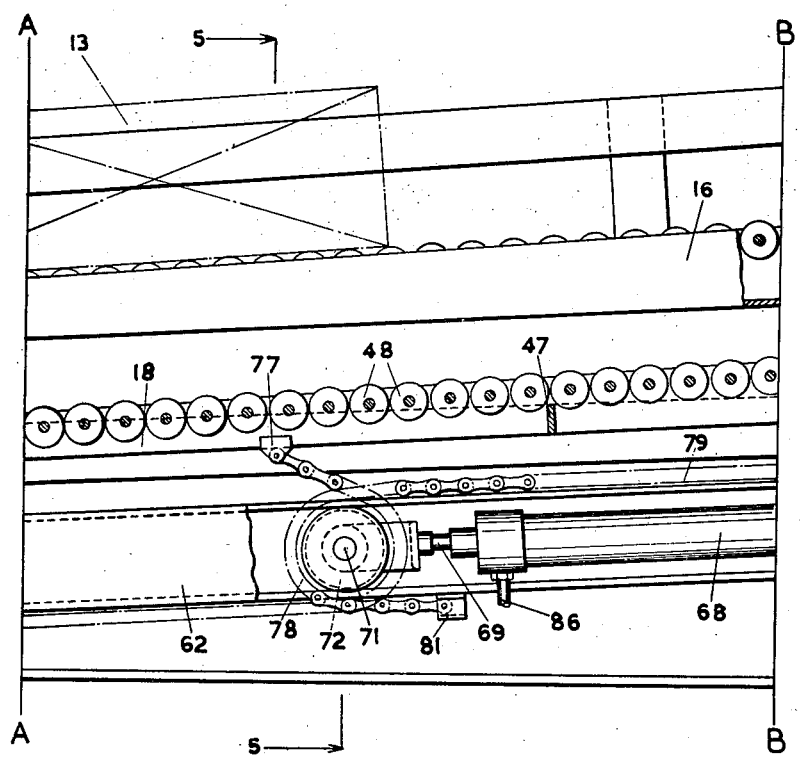
Figure 6:
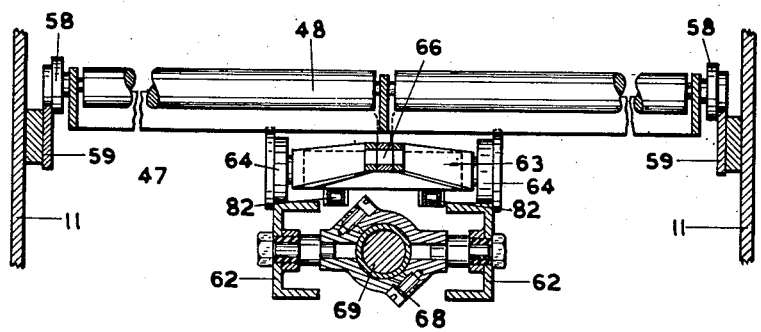
Figure 4:
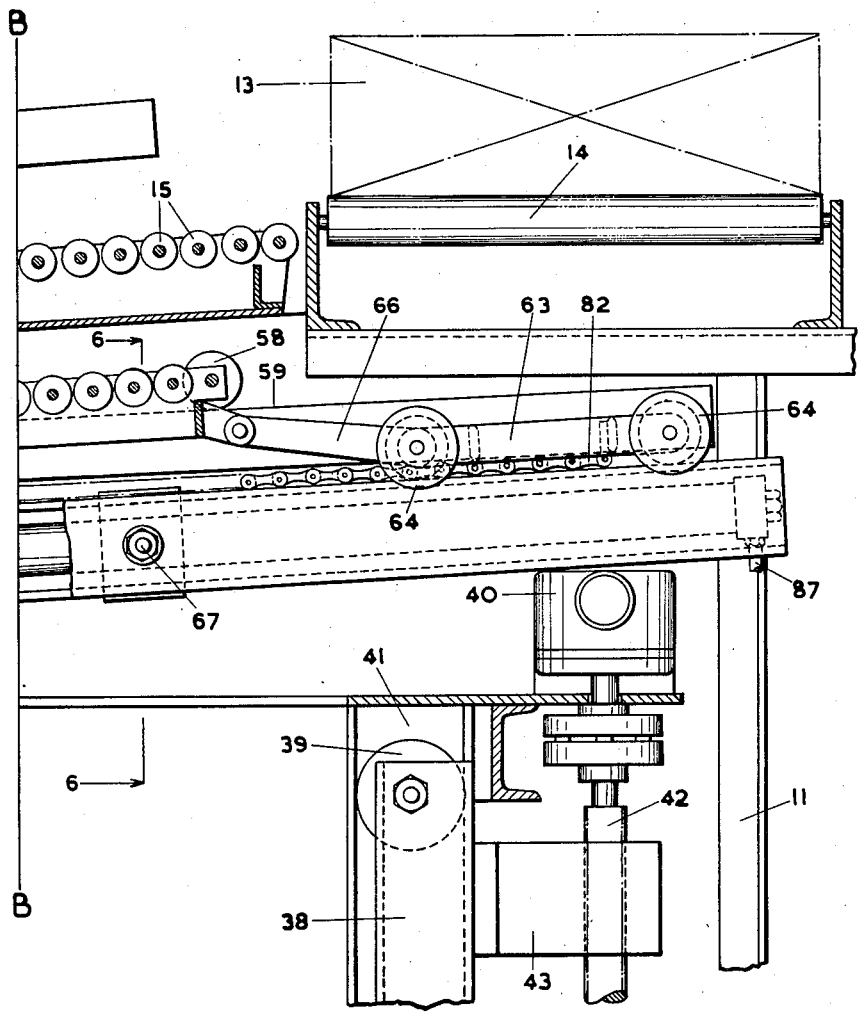

The invention will now be described in greater detail with reference to the accompanying drawings, in which FIGURE 1 is a diagram illustrating the essential elements of the machine, FIGURES 2, 3 and 4, when joined on the lines A—A and B—B, respectively, show an elevation of part of the machine shown in FIGURE 1, drawn to a larger scale, FIGURE 5 is a sectional view on the line 5—5 in FIGURE 3, and FIGURE 6 is a sectional view on the line 6—6 in FIGURE 4.

Briefly describing the essential elements of the machine a fabricated framework 11 supports a platform 12 at a height convenient for the man-handling of articles 13 (shown in this example as cartons) from a feed conveyor 14 on to a downwardly inclined loading platform 16 consisting of a series of freely mounted rollers 15 in layers between side guides 17. Arranged below the loading platform 16 is a stripping plate 18 movable to the position indicated in chain-dotted lines in FIGURE 1 to receive a layer of cartons 13 from the loading platform 16 upon lifting of a movable end stop bar 19, pivoted at 21 and operable by a link 22, the bar extending across the width of the platform 16. In the forward position, the plate 18 is immediately over a pallet 23 (or a previously formed layer of cartons 13 on the pallet) supported on a carriage consisting of a pair of supports 24 each extending from a trolley 26, mounted on rollers 27 movable in vertical tracks 28, the trolleys 26 being actuated by screws 29 driven by a motor 31 through reduction gears 32, the screws 29 engaging nut members 33 in the trolleys 26.

Running the length of the machine is a main conveyor 34 arranged to receive each loaded pallet 23 and pass it forward to a delivery conveyor 36. The conveyor 34 passes under a stack of pallets 23 supported on a pair of extensions 37 from a trolley 38 mounted on rollers 39 arranged to run in tracks 41, and operable by a rotatable screw 42 engaging a nut member 43 in the trolley 38, the screw being driven by a motor 40 fitted with appropriate reduction gear. The lowermost pallet 23 is lowered on to the conveyor 34 while the rest of the stack is supported by a clamping device consisting of a pair of pneumatically operated plungers 44 arranged to engage the pallet 23 next to the lowermost one and thrust it against an abutment 46.

The stripping plate 18 consists of a framework 47 in which is freely mounted a number of rollers 48 so that the articles 13 pass freely from the loading platform 16 on to the plate 18. The forward extremity of the plate 18 consists of a dead plate 49 of wedge shape pivoted at 51 and having an arm 52 by which the dead plate 49 is urged upwardly by a spring 53, a stop 54 limiting the upward movement. The plate 18 is provided at the forward end with a pair of rollers 56 arranged to run on horizontal rails 57, and at the rearward end with a further pair of rollers 58 arranged to bear on inclined rails 59 terminating adjacent the forward edge of the loading platform 16 in ramps 61.

Secured to the framework 11 and extending centrally below the plate 18 is a pair of channels 62 the upper flange of which serves to support a trolley 63 provided with wheels 64 the trolley 63 being pivotally connected to the plate 18 by a link 66.

Pivotally mounted at 67 between the channels 62 is a double-acting pneumatic cylinder 68 the piston rod 69 of which is pivotally connected to a shaft 71 provided with a pair of rollers 72 arranged to run on the lower flanges of the channels 62. A central sprocket 73 is freely mounted on the shaft 71 and is embraced by a chain 74 one end of which is secured to the framework 11 at 76 and the other end to the plate 18 and 77. Two outer sprockets 78 are freely mounted on the shaft 71 and are embraced by a pair of chains 79 each connected at one end to one of the channels 62 at 81 and at the other end to the trolley 63 at 82.

In operation, an operator standing on the platform 12 slides cartons 13 from the conveyor 14 on to the loading platform and arranges them in an orderly layer with the forward cartons 13 abutting the stop 19. As each layer is completed, the operator presses a foot switch 83 which starts an automatic sequence of operations. The stop 19 lifts to clear the forward edge of the layer, thus freeing that layer for forward movement under gravity on to the stripping plate 18, which at this stage is in the forward position shown in chain-dotted lines in FIGURE 1, the extent of the forward movement of the layer being determined by a movable stop bar 84 extending across the width of the machine. The dead plate 49 provides frictional resistance to the cartons as they approach the stop 84.

As the forward cartons 13 of the layer reach the stop 84 a switch is operated to actuate a valve to admit pressure air to the forward inlet 86 of the cylinder 68, thus causing the stripping plate 18 to be retracted by the sprocket 73 rolling along the chain 74, the rearward rollers 58 passing down the ramps 61 to cause the rear end of the plate 18 to pass below the loading platform 16. As retraction of the plate 18 continues, the layer is stripped off the plate 18 by the stop bar 19 (which has returned in the meantime to its lowermost position to act as a stripping abutment and passes smoothly on to the pallet 23, the dead plate 49 acting as a ramp down which the cartons 13 successively slide during the stripping action, thus avoiding any substantial drop.

As the plate 18 reaches its fully retracted position, a switch is actuated to cause the carriage 26 to move downwardly a distance equal to the height of a layer of cartons 13 so that the upper surface of the layer on the pallet 23 now lies in the plane originally occupied by the upper surface of the pallet. As the carriage 26 reaches its new position, a switch operates to stop the motor 31 and actuate the valve mentioned above to admit pressure air to the rear inlet 87 of the cylinder 68, thus causing the plate 18 to be moved forward by the sprockets 78 rolling along the chains 79. The cycle is then repeated until the pallet 23 is fully loaded and the carriage 26 reaches its lowermost position. As this position is reached a switch is tripped to cause movement of the conveyor 34 and at the same time to lift the stop bar 84 to allow the loaded pallet to be moved forward by the conveyor 34 onto the delivery conveyor 36, such movement also bringing forward an empty pallet 23 previously lowered on to the conveyor 34 by the extensions 37, in the manner described above, in response to the tripping of a switch by the carriage 26 as it approaches its lowermost position, the switch causing operation of the screw 42. The extent of the lowering movement is determined by a limit switch.

The lowermost pallet 23 lowered on to the conveyor 34 from the stack in this manner engages a spring-loaded bar 88 which causes partial completion of the circuit of the motor driving the conveyor 34, the circuit being completed by the switch operated by the carriage 26, as explained above, to cause operation of the conveyor 34. As the empty pallet passes off the end of the bar 88 into position above the carriage 26, the bar 88 springs upwardly to break the circuit of the motor driving the conveyor 34 and at the same time switch in the motor 31 to raise the carriage 26 with the empty pallet 23 into the loading position determined by a limit switch, the stripping plate 18 having returned in the meantime to the foremost position in readiness to receive the next layer of cartons 13. The springing up of the bar 88 also causes operation of the screw 42 to cause upward movement of the extensions 37 until they reach the pallet 23 held by the plunger 44, at which position a valve is operated to release the plungers and thus allow the stack of pallets to rest on the extensions 37. The complete loading cycle is then repeated to provide another unit load.

I claim:

1. A pallet loading mechanism of the kind described, comprising a loading platform, a pallet carriage arranged adjacent the loading platform, a stripper plate mounted for movement into a load-receiving position above the pallet carriage and substantially in line with the loading platform and retractable to a position below the loading platform to strip a layer of articles off the plate, a pair of spaced tracks, rollers mounted on the stripper plate for engagement with the tracks, the portion of the tracks adjacent the forward edge of the loading platform being shaped to cause the rear edge of the plate to fall below the level of the platform during initial retracting movement of the plate, and a stripping abutment for engaging the rear face of the layer during the stripping action.

2. A pallet loading mechanism of the kind described, comprising a loading platform, a pallet carriage arranged adjacent the loading platform, a stripper plate mounted for movement into a load-receiving position above the pallet carriage and substantially in line with the loading platform and retractable to a position below the loading platform to strip a layer of articles off the plate, said plate consisting of a number of rollers and a dead plate of wedge shape at the discharge end of the plate, a pair of spaced tracks, rollers mounted on the stripper plate for engagement with the tracks, the portion of the tracks adjacent the forward edge of the loading platform being shaped to cause the rear edge of the plate to fall below the level of the platform during initial retracting movement of the plate, and a stripping abutment for engaging the rear face of the layer during the stripping action.

3. A pallet loading mechanism of the kind described, comprising a loading platform, a pallet carriage arranged adjacent the loading platform, a stripper plate mounted for movement into a load-receiving position above the pallet carriage and substantially in line with the loading platform and retractable to a position below the loading platform to strip a layer of articles off the plate, said plate being provided at its discharge end with a dead plate of wedge shape pivoted on the plate in the form of an end flap, spring means for urging the dead plate upwardly against a limit stop, a pair of spaced tracks, rollers mounted on the stripper plate for engagement with the tracks, the portion of the tracks adjacent the forward edge of the loading platform being shaped to cause the rear edge of the plate to fall below the level of the platform during initial retracting movement of the plate, and a stripping abutment for engaging the rear face of the layer during the stripping action.

References Cited in the file of this patent

UNITED STATES PATENTS

| | | |
|---|---|---|
| 1,556,695 | Kronborg | Oct. 13, 1925 |
| 2,065,674 | Fay | Dec. 29, 1936 |
| 2,769,558 | Ehlers | Nov. 6, 1956 |
| 2,774,489 | Guigas | Dec. 18, 1956 |
| 2,858,043 | Fenton | Oct. 28, 1958 |
| 2,875,907 | Locke | Mar. 3, 1959 |
| 2,946,465 | Raynor | July 26, 1960 |
| 3,003,661 | McGrath | Oct. 10, 1961 |

OTHER REFERENCES

Greer publication, "The Palletizer" (J. W. Greer Co., Wilmington, Mass.), received in Patent Office, May 18, 1955.